(12) United States Patent
Coon et al.

(10) Patent No.: US 8,430,449 B2
(45) Date of Patent: Apr. 30, 2013

(54) STRUCTURAL MOUNTING INSERT

(75) Inventors: Thomas L. Coon, Lapeer, MI (US);
Steve Zdrojewski, Deckerville, MI (US); Keith Novak, Attica, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 13/185,589

(22) Filed: Jul. 19, 2011

(65) Prior Publication Data
US 2012/0090255 A1  Apr. 19, 2012

Related U.S. Application Data (63) Continuation of application No. 11/969,389, filed on Jan. 4, 2008, now Pat. No. 8,002,332.

(60) Provisional application No. 60/951,327, filed on Jul. 23, 2007, provisional application No. 60/887,287, filed on Jan. 30, 2007.

(51) Int. Cl.
*B60J 7/00*  (2006.01)

(52) U.S. Cl.
USPC ................ 296/187.02; 296/191

(58) Field of Classification Search ......... 296/187.02, 296/146.11, 12, 191; 156/79; 293/117, 120
See application file for complete search history.

(56) References Cited

U.S. PATENT DOCUMENTS

| | | | |
|---|---|---|---|
| 2,997,122 A | 8/1961 | Stuart et al. | |
| 3,124,626 A | 3/1964 | Graham et al. | |
| 3,451,696 A | 6/1969 | Hagelin et al. | |
| 3,586,556 A | 6/1971 | Clark et al. | |
| 4,319,768 A | 3/1982 | Youngdale | |
| 4,332,397 A | 6/1982 | Steger | |
| 4,810,548 A | 3/1989 | Ligon et al. | |
| 4,922,596 A | 5/1990 | Wycech | |
| 4,978,562 A | 12/1990 | Wycech | |
| 4,981,287 A | 1/1991 | Cothenet | |
| 5,124,186 A | 6/1992 | Wycech | |
| 5,266,133 A | 11/1993 | Hanley | |
| 5,344,208 A | 9/1994 | Bien et al. | |
| 5,358,397 A | 10/1994 | Ligon et al. | |
| 5,431,363 A | 7/1995 | Ezzat et al. | |
| 5,487,803 A | 1/1996 | Sweeney et al. | |
| 5,506,025 A | 4/1996 | Otto et al. | |

(Continued)

FOREIGN PATENT DOCUMENTS

| | | |
|---|---|---|
| EP | 0623758 | 11/1994 |
| EP | 0893332 A1 | 1/1999 |

(Continued)

OTHER PUBLICATIONS

International Search Report, Dated Jun. 24, 2008, Application No. PCT/US2008/052004.

(Continued)

*Primary Examiner* — Glenn Dayoan
*Assistant Examiner* — Pinel Romain
(74) *Attorney, Agent, or Firm* — The Dobrusin Law Firm, P.C.

(57) ABSTRACT

A structural mounting insert for sealing between and/or adhering to surfaces of members is described. The insert includes a base member and activatable material about the base material.

20 Claims, 6 Drawing Sheets

U.S. PATENT DOCUMENTS

| | | | |
|---|---|---|---|
| 5,552,095 A | 9/1996 | Merser et al. | |
| 5,571,355 A | 11/1996 | Kornylo | |
| 5,575,526 A | 11/1996 | Wycech | |
| 5,690,035 A * | 11/1997 | Hatayama et al. | 105/452 |
| 5,743,979 A | 4/1998 | Lorbiecki | |
| 5,752,342 A | 5/1998 | Kreye | |
| 5,755,486 A | 5/1998 | Wycech | |
| 5,766,719 A | 6/1998 | Rimkus | |
| 5,884,960 A | 3/1999 | Wycech | |
| 5,904,024 A | 5/1999 | Miwa | |
| 5,932,680 A | 8/1999 | Heider | |
| 5,997,786 A | 12/1999 | Arthur et al. | |
| 6,030,701 A | 2/2000 | Johnson et al. | |
| 6,074,506 A | 6/2000 | Herring, Jr. et al. | |
| 6,103,341 A | 8/2000 | Barz et al. | |
| 6,131,897 A | 10/2000 | Barz et al. | |
| 6,199,940 B1 | 3/2001 | Hopton et al. | |
| 6,247,287 B1 | 6/2001 | Takabatake | |
| 6,270,600 B1 | 8/2001 | Wycech | |
| 6,293,572 B1 | 9/2001 | Robbins et al. | |
| 6,368,438 B1 | 4/2002 | Chang et al. | |
| 6,379,762 B1 | 4/2002 | Omichinski | |
| 6,382,635 B1 | 5/2002 | Fitzgerald | |
| 6,422,575 B1 | 7/2002 | Czaplicki | |
| 6,467,834 B1 | 10/2002 | Barz | |
| 6,468,613 B1 | 10/2002 | Kitano et al. | |
| 6,471,285 B1 | 10/2002 | Czaplicki et al. | |
| 6,482,486 B1 | 11/2002 | Czaplicki | |
| 6,511,120 B1 | 1/2003 | Mitts | |
| 6,530,577 B1 | 3/2003 | Busby et al. | |
| 6,543,976 B1 | 4/2003 | Malofsky | |
| 6,585,202 B2 | 7/2003 | Broccardo | |
| 6,668,457 B1 | 12/2003 | Czaplicki | |
| 6,708,368 B2 | 3/2004 | Nhep et al. | |
| 6,711,800 B2 | 3/2004 | Savoy | |
| 6,719,293 B1 | 4/2004 | Coles et al. | |
| 6,786,533 B2 | 9/2004 | Bock et al. | |
| 6,793,274 B2 | 9/2004 | Riley et al. | |
| 6,808,774 B2 | 10/2004 | Autterson et al. | |
| 6,855,652 B2 | 2/2005 | Hable et al. | |
| 6,890,021 B2 | 5/2005 | Bock et al. | |
| 6,923,499 B2 | 8/2005 | Wieber et al. | |
| 6,941,719 B2 | 9/2005 | Busseuil et al. | |
| 6,953,219 B2 | 10/2005 | Lutz et al. | |
| 6,969,551 B2 | 11/2005 | Richardson et al. | |
| 6,991,237 B2 | 1/2006 | Kassa et al. | |
| 7,004,536 B2 | 2/2006 | Wieber | |
| 7,022,400 B2 | 4/2006 | Bolling | |
| 7,077,460 B2 | 7/2006 | Czaplicki et al. | |
| 7,077,461 B2 * | 7/2006 | Ratet | 296/187.02 |
| 7,111,882 B2 * | 9/2006 | Corscadden et al. | 293/120 |
| 7,199,165 B2 | 4/2007 | Kassa et al. | |
| 7,249,215 B2 | 7/2007 | Surico et al. | |
| 7,255,388 B2 | 8/2007 | Le Gall et al. | |
| 7,290,828 B2 * | 11/2007 | Kosal et al. | 296/187.02 |
| 7,318,873 B2 | 1/2008 | Czaplicki et al. | |
| 7,422,088 B2 * | 9/2008 | Ito | 181/198 |
| 7,428,774 B2 | 9/2008 | Thomas et al. | |
| 7,469,459 B2 | 12/2008 | Kosal et al. | |
| 7,484,946 B2 | 2/2009 | Nitsche et al. | |
| 7,494,179 B2 | 2/2009 | Deachin et al. | |
| 7,503,620 B2 | 3/2009 | Brennecke et al. | |
| 7,521,093 B2 | 4/2009 | Finerman et al. | |
| 7,677,639 B2 | 3/2010 | Cafeo et al. | |
| 7,787,186 B2 | 8/2010 | White et al. | |
| 7,941,925 B2 | 5/2011 | Larsen et al. | |
| 7,984,919 B2 | 7/2011 | Nitsche et al. | |
| 8,002,332 B2 | 8/2011 | Coon et al. | |
| 8,070,994 B2 | 12/2011 | Carlson et al. | |
| 8,163,116 B2 | 4/2012 | Riley | |
| 8,181,327 B2 | 5/2012 | Apfel | |
| 2002/0024233 A1 | 2/2002 | Kleino | |
| 2004/0018341 A1 | 1/2004 | Richardson et al. | |
| 2004/0076831 A1 | 4/2004 | Hable et al. | |
| 2005/0121942 A1 | 6/2005 | Repp et al. | |
| 2005/0166532 A1 | 8/2005 | Barz | |
| 2005/0244215 A1 | 11/2005 | Prat et al. | |
| 2005/0260399 A1 | 11/2005 | Finerman | |
| 2005/0268454 A1 | 12/2005 | White | |
| 2006/0000186 A1 | 1/2006 | Carlson et al. | |
| 2006/0003044 A1 | 1/2006 | DiNello et al. | |
| 2006/0260204 A1 | 11/2006 | Repp et al. | |
| 2007/0045866 A1 | 3/2007 | Gray et al. | |
| 2007/0090560 A1 | 4/2007 | Kassa et al. | |
| 2007/0101679 A1 | 5/2007 | Harthcock | |
| 2007/0257515 A1 | 11/2007 | Larsen et al. | |
| 2007/0281523 A1 | 12/2007 | Riley | |
| 2008/0012263 A1 | 1/2008 | Dickson et al. | |
| 2008/0061602 A1 | 3/2008 | Czaplicki et al. | |
| 2008/0179913 A1 | 7/2008 | Coon et al. | |
| 2008/0226866 A1 | 9/2008 | Vilcek et al. | |
| 2008/0254214 A1 | 10/2008 | Kassa et al. | |
| 2009/0202294 A1 | 8/2009 | Apfel | |
| 2009/0211161 A1 | 8/2009 | Dries | |
| 2010/0289242 A1 | 11/2010 | Nitsche et al. | |

FOREIGN PATENT DOCUMENTS

| | | |
|---|---|---|
| EP | 1122152 A2 | 8/2001 |
| FR | 2812268 A1 | 2/2002 |
| FR | 2881458 A1 | 8/2006 |
| GB | 1541482 A | 3/1979 |
| GB | 2224683 A | 5/1990 |
| JP | 2004/036660 | 2/2004 |
| SU | 1803616 A1 | 3/1993 |
| WO | 00/27920 A1 | 5/2000 |
| WO | 2007/050536 A1 | 5/2001 |
| WO | 2005/077634 A2 | 8/2005 |
| WO | 2005/002950 A2 | 11/2005 |

OTHER PUBLICATIONS

Co-pending application, U.S. Appl. No. 11/115,668, filed Apr. 27, 2005, published as 2005/0260399.

Co-pending application, U.S. Appl. No. 11/151,957, filed Jun. 14, 2005, published as 2006/0000186.

Co-pending application, U.S. Appl. No. 11/944,075, filed Nov. 21, 2007, published as 2008/0061602.

Co-pending application, U.S. Appl. No. 11/767,755, filed Jun. 25, 2007, published as 2007/0257515.

Co-pending application, U.S. Appl. No. 11/188,586, filed Jun. 25, 2005, published as 2005/0268454.

Co-pending application, U.S. Appl. No. 11/742,025, filed Apr. 30, 2007, published as 2007/0281523.

Co-pending application, U.S. Appl. No. 11/020,717, filed Dec. 22, 2004, published as 2005/0166532.

Co-pending application, U.S. Appl. No. 11/969,389, filed Jan. 4, 2008, patented as 8,002,332.

European Office Action dated Oct. 12, 2011, European Application No. 08 728 266.1-1252.

Russian Office Action dated Jul. 13, 2011, Russian Application No. 2009132481.

Co-pending application, U.S. Appl. No. 13/162,628, filed Jun. 17, 2011.

Chinese Office Action dated Mar. 30, 2011, Chinese Application No. 200880009527.3.

International Preliminary Report on Patentability, dated Aug. 11, 2011, PCT/US2010/035122.

Co-pending application, U.S. Appl. No. 09/939,152, filed Aug. 24, 2001, now Patent No. 6,855,652.

Co-pending application, U.S. Appl. No. 10/404,831, filed Apr. 1, 2003, now Patent No. 6,969,551.

Co-pending application, U.S. Appl. No. 10/337,446, filed Jan. 7, 2003, now U.S. Patent No. 7,318,873.

Co-pending application, U.S. Appl. No. 11/136,742, filed May 25, 2005, now Patent No. 7,428,774.

Co-pending application, U.S. Appl. No. 11/871,523, filed Oct. 12, 2007, now U.S. Patent Application No. 2008/0254214.

Co-pending application, U.S. Appl. No. 12/367,152, filed Feb. 6, 2009, now U.S. Patent Application No. 2009/0202294.
Co-pending application, U.S. Appl. No. 12/467,478, filed May 18, 2009, now U.S. Patent Application No. 2010/0289242.
Japanese Office Action Application No. 2009/548367 dated Sep. 5, 2012.
Japanese Patent Application No. 2009-548367, Office Action dated Sep. 25, 2012.
Chinese Office Action Patent Application No. 2008 80009527.3 dated Mar. 27, 2012.

* cited by examiner

STRUCTURAL MOUNTING INSERT

CLAIM OF PRIORITY

This application is a continuation of Ser. No. 11/969,389, filed on Jan. 4, 2008 now U.S. Pat. No. 8,002,332, which claims the benefit of U.S. Provisional Application Ser. No. 60/887,287 filed Jan. 30, 2007 and U.S. Provisional Application Ser. No. 60/951,327 filed Jul. 23, 2007 all of which are incorporated herein by reference for all purposes.

FIELD OF THE INVENTION

The present invention relates to a methods and devices for the protection of two or more joined components from corrosion, loosening of fasteners (e.g., torque fall off) or both.

BACKGROUND OF THE INVENTION

For many years, industry has developed sealing materials and structural materials that can be located between surfaces of members for limiting exposure of those surfaces to ambient environments and/or for assisting in connecting the surfaces together. Such materials, however, suffer from drawbacks. As one example, expansion/contraction characteristics of the materials during exposure to temperature variances can limit the ability of the materials to seal and/or can degrade materials. As another example, such materials can limit that ability of members to be attached to each other or have a limited ability to enhance the attachment of members to each other. Thus, the present invention is provides an insert that acts as a seal, a structural adhesive material, both or the like wherein the material at least assists in overcoming one of the aforementioned drawbacks or other drawbacks.

SUMMARY OF THE INVENTION

Accordingly, there is disclosed a structural mounting insert usable during mounting of a first and second member. The structural mounting insert is typically placed between and configured to seal the connection regions of the first and second member from the surrounding environment. The structural mounting insert typically includes a base member (e.g., a member formed of structural mesh material) shaped to correspond to the shape of the connection region between the first and second member and a heat activatable material encased over at least a portion of the structural mesh material. In one embodiment, the base member can have a plurality of opening extending therethrough and the openings can be equally shaped and spaced if desired. The heat activatable material can be located within the openings and also is typically formed of a pliable material. Upon mounting of the first and second member, the heat activatable material is typically displaced to allow direct contact between the base member and both the first and second member. Moreover, upon application of heat, the heat activatable material typically expands to fill the openings formed through the base member and to seal the base member and connection regions of the first and second members.

DETAILED DESCRIPTION

The present invention is predicated upon methods and devices for positively mounting structural members while preventing or substantially limiting exposure of such members to environmental conditions possibly leading to corrosion. Referring to the drawings, this is achieved through the use of an insert 10 placed between a first and second member 12, 14, respectively, prior to joining of the same. The insert includes a positive locating feature for maintaining a distance between the first and second member and a sealer that may be configured to fill open space between the first and second member, surround the insert and joining portions of the first and second members with the insert, or both. The sealer may be activatable, pliable or both to seal both the insert and the contacting portions 16, 18 of the structural members from the surrounding environment.

An additional advantage of the present invention is that it substantially limits or prevents torque fall off or the loosening of fasteners during thermal cycling or otherwise of the joined members. For example, during repeated cycles of warming and cooling typical sealing devices expand and contract due to the temperature change. Since the only spacer material used in these prior devices comprise the sealing material itself, it common that moisture enters the gaps formed by the seal during this thermal cycling. Also, it is common that prior sealing devices also undergo creep causing gaps to form which may be increased at elevated temperatures.

The present invention overcomes these and other problems by providing a higher strength material for forming a gap or otherwise providing a spacer between the first and second members. The sealer of the insert then seals any gaps formed between the first and second members and surround the insert thereby substantially limiting or preventing corrosion of the connecting regions of the first and second members. This is because due to the combination of the high strength spacer and the sealing material sealing the edges of the insert, moisture is substantially limited or prevented from contacting the contacting points of the first and second member, which further prevents electrolytes from initiating corrosion since they originate from moisture.

Generally, the insert 10 includes a first component 20, 62, 72 comprising a rigid material configured to resist deformation upon the application of force used to join the structural members. The insert also includes a second component 22, which preferably encases or otherwise is attached or becomes attached to the first component. The second component is at least partially pliable so as to surround the insert and the contacting points or region of the structural members. Upon joining of the first and second structural member, the second component may be activated or otherwise deformed to cause sealing of the insert and contact points of the structural members thereby limiting or preventing exposure to corrosion driving components such as water, which can corrode the structural components.

It should be appreciated that the foregoing is just one of many examples and advantages of the present invention and the follow description provides, implicitly and/or explicitly, other examples and advantages of the present invention, which are further supported by the drawings.

First Component—Spacer Material

The insert includes a first component 20 comprising a flexible or rigid material that is configured to act as a spacer for the first and second members 12, 14. However, preferably, the first component is configured in strength to substantially resist deformation during attachment of the first and second members. Accordingly, it is contemplated that the first component is formed of a high strength material.

Suitable materials that may be used to form the first component includes materials such as metal, plastic, ceramic, rubber or otherwise. In one configuration the first component is formed of polymer. In another preferred configuration, the first component is formed of metal (such as shim stock or otherwise) due to its flexibility (e.g. elasticity) and high strength for resisting plastic deformation. Examples of suitable metal materials include stainless steel, alloyed steels, coated or non-coated steel, galvanized steel, low or high carbon steel, cobalt, other metallic materials, the like or otherwise. Of course other specific materials are available such as those commonly used in textiles or otherwise.

In a first exemplary configuration, as shown in FIGS. 1-6, the first component 10 is formed with or otherwise includes a plurality of openings 24 formed therein for receiving at least a portion of the second component 22. These opening may be formed using any available forming technique (such as molding or otherwise). The openings may be geometrical or non-geometrical (i.e. irregular) in shape. The geometry of the openings may vary depending upon the needs of a given application. Available shapes of the openings include circular, triangular, square or rectangular, hexagonal, octagonal, etc, or otherwise.

Also the size of the openings 24 may vary for each application. It is contemplated that the openings includes a diameter less than 5 mm, 2 mm, 1 mm, 0.5 mm, 0.25 mm or smaller. Also, it is contemplated that the average diameter may be between 0.25 mm to 1 mm, between 0.5 mm to 1 mm, or otherwise. It should be appreciated that the shape and size of the openings may vary throughout the first component. However, in one preferred configuration the shape and size of the openings are consistent throughout the first component. When the first component includes openings, and particularly where that component is a mesh material or otherwise, there are typically at least 10, more typically at least 150 and even more typically at least 300 openings per square inch, and/or less than about 3000, more typically less than about 800 and even more typically less than about 500 openings per square inch.

The first component may be formed using different forming techniques. The first component may be woven or non-woven from one or a plurality of threads, wires or the like. The first component may comprise or be formed similar to that of a screen, or the like. With regards to woven configurations, the first component may be formed of a mesh material, such as metallic or polymer mesh, which results in the forming of openings 24. Other techniques are available.

The diameter of the threads or wires forming the first component may also vary for each application. It is contemplated that the thread or wires includes a diameter less than 10 mm, 5 mm, 2 mm, 1 mm or 0.5 mm or smaller. Also, it is contemplated that the average diameter of the threads or wires may be between 0.25 mm to 2 mm, between 0.5 mm to 1 mm, between 0.3 and 0.8 or otherwise. It should be appreciated that the shape and size of the wires may vary throughout the first component. However, in one preferred configuration the shape and size of the wires are consistent throughout the first component. Also, the cross-sectional shape of the wires may be circular, elliptical, square, rectangular, heptagon, hexagon, or otherwise.

In a second and third configuration of the first component, as discussed below in more detail, it is contemplated that the first component may include a base member having one or more members, such as projections, extending from one or both sides to contact and spatially located the base member from the first and second member. This spatial location allows for placement of the second material between the base member and first or second member to cause sealing thereof. In one configuration, the base member may be formed of nearly any type of sheet metal or other material (e.g, sheet steel such as shim stock metal), or the like, and subsequently shaped to form a plurality of projections.

In the second exemplary configuration, as shown in FIGS. 8-12, the first component includes a base member 62 having a plurality of projections 64 extending therefrom. The projections may extend from one or both sides of the base member and are preferably spaced apart. The projections may form a symmetrical or asymmetrically pattern along the base member. Accordingly, it is contemplated that the projections may form one or more repeated patterns.

The projections 64 may be attached or otherwise integrally formed with the base member to form a unitary structure. The projections may be formed using any available forming technique (such as molding, stamping, welding or otherwise). These projections may be geometrical or non-geometrical (i.e. irregular) in shape, wherein the geometry of the projections may vary depending upon the needs of a given application. Suitable shapes of the projections include circular, triangular, square or rectangular, hexagonal, octagonal, etc, or otherwise. In one preferred configuration, the projections include a top surface 66 that is parallel to the base member and includes one or more (e.g. 2, 4 or otherwise) side members 68 for connecting the top surface with the based member. These side members may perpendicular with respect to the base member or top surfaces or may be diagonally orientated.

The size of the projection may vary for each application. It is contemplated that the projection size (e.g. the top surface or the combination of the top surface and side members) may include a footprint area of about $0.25 \text{ mm}^2$, $0.5 \text{ mm}^2$, $1 \text{ mm}^2$, $2 \text{ mm}^2$, $5 \text{ mm}^2$, $10 \text{ mm}^2$, or more. It should be appreciated that the footprint size of the projection may vary throughout the first component. However, in one preferred configuration the foot print size of the projections are consistent throughout the first component.

Preferably, all or part of the base member and/or projections includes a layer of the second component 22 thereover. The second component may be located on one or both sides of the first component. However, in one preferred configuration, the second component is located on both sides of the base member and on the projections.

In the third exemplary configuration, as shown in FIGS. 13-17, the first component includes a base member 72 having a plurality of projections 74 extending therefrom. The projections may extend from one or both sides of the base member and are preferably spaced apart. The projections may form a symmetrical or asymmetrically pattern along the base member. Accordingly, it is contemplated that the projections may form one or more repeated patterns.

The projections 74 may be attached or otherwise integrally formed with the base member to form a unitary structure. The projections may be formed using any available forming technique (such as molding, stamping, welding or otherwise). These projections may be geometrical or non-geometrical (i.e. irregular) in shape, wherein the geometry of the projections may vary depending upon the needs of a given application. Suitable shapes of the projections include circular, triangular, square or rectangular, hexagonal, octagonal, etc, or otherwise. In one preferred configuration, the projections include a top surface or portion 76 that is parallel to the base member and includes one or more side members 78 for connecting the top surface with the based member. These side members may perpendicular with respect to the base member or top surfaces or may be diagonally orientated. Still further, the side member may comprise an arcuate member. However, in one configuration, the combination of the top portion and side portion comprises a dome like structure The size of the projection may vary for each application. It is contemplated that the projection size (e.g. the top surface or the combination of the top surface and side members) may include a footprint area of about $0.25 \text{ mm}^2$, $0.5 \text{ mm}^2$, $1 \text{ mm}^2$, $2 \text{ mm}^2$, $5 \text{ mm}^2$, $10 \text{ mm}^2$ or more. It should be appreciated that the footprint size of the projection may vary throughout the first component. However, in one preferred configuration the foot print size of the projections are consistent throughout the first component.

Preferably, all or part of the base member and/or projections includes a layer of the second component 22 thereover. The second component may be located on one or both sides of the first component. However, in one preferred configuration, the second component is located on both sides of the base member and on the projections.

With respect to the different embodiments contained herein, or otherwise, it is contemplated that all or a portion of the first component may be coated, such as with a sealer or otherwise.

Second Component—Sealant Material

The insert also includes a second component comprising a sealant material adapted to seal the insert and connecting regions of the first and second members. The second material may be configured to displace (e.g. elastically, plastically or both) during joining of a first and second member. The second component is provided with the first component during use or application to the first and/or second member. Preferably, the second component is attached or otherwise joined with the first component to improve installation and reduce manufacturing cost.

In one configuration, the second component substantially or entirely encases the first component. The second component may be applied to the first component using common techniques as described herein. However, in one preferred configuration, the first component is dipped or otherwise immersed by the second component.

The second component may be formed of any of the material components discussed herein. This includes sealant materials, materials to reduce noise vibration harshness, structural materials or otherwise. However, in a preferred configuration the material is configured to form a seal and prevent moisture (such as corrosive fluids of any kind, including water or otherwise) from entering between the second component and the first or second members.

The second component may comprise a non-activatable material, an activatable material or a combination of both. For example, the second component may comprise a non-activatable material, such as a typical gasket or otherwise used or capable to seal components and which undergoes little to no physical or chemical change upon application of energy. Alternatively, the second component may comprise an activatable material which does undergo physical and/or chemical change upon application of energy, as described herein. Still further, it is further contemplated that only a portion of the second component may be activatable.

In one preferred configuration, the second component comprises or includes an activatable material to cause sealing. More preferably, the second component comprises a heat activatable material configured to expand upon application of energy (such as heat or otherwise). In another preferred configuration, the second component comprises a non-expandable material and/or a non-activatable material, wherein the second material forms about the contact region of the first and second members and fills open space therebetween. Additional suitable materials and forming techniques for the second component are discussed below.

The expandable material may be applied to the carrier using molding or shaping techniques, which may be automatic, semi-automatic or manual. Such techniques include blow molding, rotation molding, injection molding, compression molding casting, or otherwise. In one highly preferred configuration, the expandable material is applied to the carrier through an extrusion (e.g. co-extrusion) process.

The thickness of the second component may vary depending upon a number of factors such as whether and to what level the second component is activatable or expandable. The thickness may also be dependent upon the volume of open space between the first and second members, or about the first component, to be filled. Still further, the thickness may be based upon the pliability of the second component. Examples of suitable thicknesses include between about 0.5 to 10 mm or between about 1 to 5 mm or otherwise.

The expandable material may be formed of several different materials. Generally speaking, the member may utilize technology and processes for the forming and applying the expandable material such as those disclosed in U.S. Pat. Nos.

4,922,596, 4,978,562, 5,124,186, and 5,884,960 and commonly owned, co-pending U.S. application Ser. No. 09/502,686 filed Feb. 11, 2000 and Ser. No. 09/524,961 filed Mar. 14, 2000, and U.S. application Ser. No. 10/867,835, filed Jun. 15, 2004, all of which are expressly incorporated by reference for all purposes. Typically, when used for reinforcement, the expandable material form a high compressive strength and stiffness heat activated reinforcement material (e.g. foam) having foamable characteristics. For example, the compressive strength modulus of the material is preferably greater than about 100 Mpa and more preferably greater than about 800 Mpa and still more preferably greater than about 1500 Mpa.

The material may be generally dry to the touch or tacky and can be placed upon the first component or the like in any form of desired pattern, placement, or thickness, but is preferably of substantially uniform thickness. One exemplary expandable material is L-5204 structural foam available through L&L Products, Inc. of Romeo, Mich.

Examples of other suitable tacky or non-tacky materials include L-2663, L-2610, L-2609, L-2701 or other similar material available through L&L Products, Inc. of Romeo, Mich.

Though other heat-activated materials are possible for the expandable material, a preferred heat activated material is an expandable polymer or plastic, and preferably one that is foamable. A particularly preferred material is an epoxy-based structural foam. For example, and without limitation, the structural foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing or sealing foams are known in the art and may also be used to produce the structural foam. A typical structural foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material or a thermoset material, the structural foam is usually initially processed as a flowable thermoplastic material before curing. Such a material will typically cross-link upon curing, which makes the material incapable of further flow.

An example of a preferred structural foam formulation is an epoxy-based material that is commercially available from L&L Products of Romeo, Mich., under the designations L5206, L5207, L5208, L5209. One advantage of the preferred structural foam materials over prior art materials is that the preferred materials can be processed in several ways. The preferred materials can be processed by injection molding, extrusion compression molding, overmolding onto a carrier or with a mini-applicator. This enables the formation and creation of part designs that exceed the capability of most prior art materials. In one preferred embodiment, the structural foam (in its uncured state) generally is dry or relatively free of tack to the touch and can easily be attached to the carrier member through fastening means which are well known in the art.

While the preferred materials for fabricating the expandable material have been disclosed, the expandable material can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. See also, U.S. Pat. Nos. 5,766,719; 5,755,486; 5,575,526; and 5,932,680, (incorporated by reference). In general, the desired characteristics of the expandable material include relatively high stiffness, high strength, high glass transition temperature (typically greater than 70 degrees Celsius), and adhesion durability properties. In this manner, the material does not generally interfere with the materials systems employed by automobile manufacturers. Exemplary materials include materials sold under product designation L5207 and L5208, which are commercially available from L&L Products, Romeo, Mich.

Typically, when used for reinforcement, the expandable material is configured to expand to a volume that is between 110% and 500% more typically between 130% and 300% and even more typically between 150% and 250% of its original unexpanded volume. It is also contemplated that, when the system of the present invention is used for sealing or baffling, the expandable material may be designed to absorb or attenuate sound, block off and prevent passage of materials through a cavity or the like. As such, the expandable material may be configured to expand to a volume that is at least 200%, at least 400%, at least 800%, at least 1600% of even at least 3000% or its original unexpanded volume. Examples of such expandable material are discussed in U.S. application Ser. No. 10/867,835, filed Jun. 15, 2004, expressly incorporated by reference.

In applications where the expandable material is a heat activated, thermally expanding material, an important consideration involved with the selection and formulation of the material comprising the structural foam is the temperature at which a material reaction or expansion, and possibly curing, will take place. For instance, in most applications, it is undesirable for the material to be reactive at room temperature or otherwise at the ambient temperature in a production line environment. More typically, the structural foam becomes reactive at higher processing temperatures, such as those encountered in an assembly plant, when the foam is processed along with the automobile components at elevated temperatures or at higher applied energy levels, e.g., during paint curing steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. Similarly, during manufacturing of other transportation device (e.g., bicycle, motorcycles, all terrain vehicles or otherwise), higher temperatures may also be used during paint curing process (such as powder coat applications) or otherwise. In one configuration, the material becomes reactive at temperatures greater than about 120° C., or greater than about 150° C. or even greater than about 160° C. If needed, blowing agent activators can be incorporated into the composition to cause expansion at different temperatures outside the above ranges.

By specific example, it is contemplated that the material may be cured in a powder coat paint cure operation. In such an operation, the material may be exposed to a temperature range between approximately 120°-230° C. with an exposure time between about 10 minutes to 60 minutes. Also, it is contemplated that the material may be cured in a precipitation hardening cure operation. In this operation, the material may be exposed to a temperature range between approximately 150°-230°C. with an exposure time between about 45 minutes to 8 hours.

Generally, suitable expandable foams have a range of expansion ranging from approximately 0 to over 1000 percent. The level of expansion of the expandable material 30 may be increased to as high as 1500 percent or more. Typically, strength and stiffness are obtained from products that possess lower expansion.

Some other possible materials for the expandable material include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). In general, the desired characteristics of the resulting material include relatively low glass transition point, and good adhesion durability properties. In this manner, the material does not generally interfere with the materials systems employed by automotive or other vehicle manufacturers (e.g., motorcycle, bicycle, all terrain vehicles or otherwise). Moreover, it will withstand the processing conditions typically encountered in the manufacture of a vehicle, such as the e-coat priming, cleaning and degreasing and other coating processes, as well as the painting operations encountered in final vehicle assembly.

In another embodiment, the expandable material is provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen structure, carrier member or the like, and applying it to thereto.

The skilled artisan will appreciate that the system may be employed in combination with or as a component of a conventional sound blocking baffle, or a vehicle structural reinforcement system, such as is disclosed in commonly owned co-pending U.S. application Ser. Nos. 09/524,961 or 09/502,686 (hereby incorporated by reference).

It is contemplated that the material of the expandable material could be delivered and placed into contact with the assembly members, through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In this non-limiting embodiment, the material or medium is at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) wherein the foamable or expandable material can be snap-fit onto the chosen surface or substrate; placed into beads or pellets for placement along the chosen substrate or member by means of extrusion; placed along the substrate through the use of baffle technology; a die-cast application according to teachings that are well known in the art; pumpable application systems which could include the use of a baffle and bladder system; and sprayable applications.

In another preferred configuration, as previously mentioned, the second material may be non-activatable and/or non-expandable. In this configuration, it is contemplated that upon application of force, and optionally activation, the second material plastically deforms to surround the insert and the contact region of the first and second insert to cause sealing of the same. Accordingly, in one configuration, the second material may comprise a gasket. For example, the second material may comprise any suitable gasket used for sealing joined components.

The shape and size of the insert may vary between applications. It is contemplated that the insert may be generally square or rectangular in shape. However, other shapes include circular, elliptical, heptagonal, hexagons, etc, or otherwise, including regular or irregular shapes are contemplated. The thickness of the insert may also vary depending upon the application and application of force. However, the thickness may be less than 10 mm, 5 mm, 2 mm or less. Accordingly, it is contemplated that the insert has a continuous thickness in the range of 1 mm to 10 mm or even 2 mm to 5 mm or otherwise.

Method of Use

Referring to FIGS. 2-6, FIGS. 8-12 and FIGS. 13-17, three examples of use of the insert of the present invention are shown, respectively. The present invention is particularly suited for fastening (e.g. bolted or otherwise) systems for joining and maintaining a distance between two or more members. The insert, as described herein, is placed between a first and second member 12, 14 prior to attachment of the same. The first and second members are then brought together and an application of force 'F' is applied, through the used of fastening devices, or otherwise.

As shown in the three examples, openings may be formed between the first component and the first and second members 12, 14. These openings may be partially or completely filled by the second component before activation of the second material, after activation of the second material or both. For example, during attachment of the first and second member, the generated torque formed during attachment of the first and second members may cause the second material located over the first component to displace and partially or completely fill the open spaces prior to activation. Alternatively, or in addition to pre-activation filling of the open spaces, during activation of the second material the open spaces may be additionally filled with an expanding second material.

Figure 1:
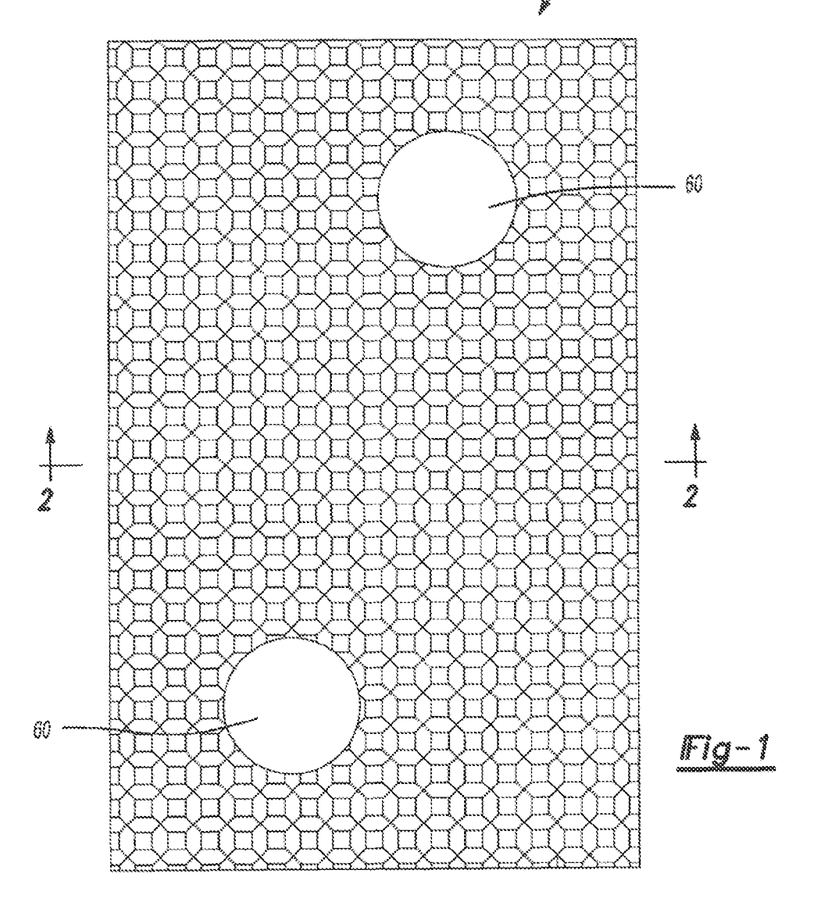
FIG. 1 illustrates a top view of one configuration of the structural mounting insert according to the teachings of the present invention.
Figure 2:
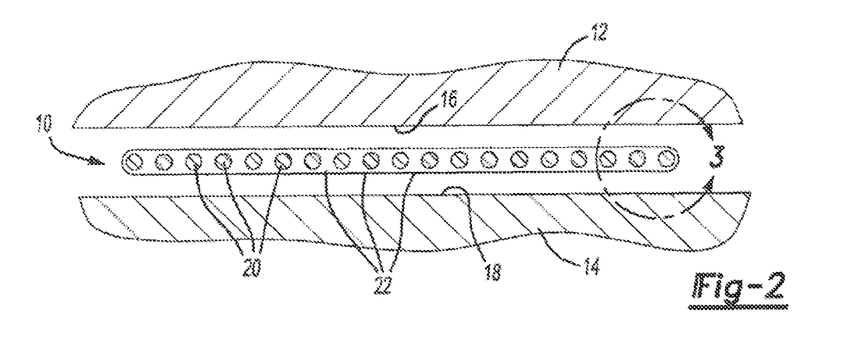
FIG. 2 illustrates a cross sectional view of the structural insert shown in FIG. 1 with the addition of a first and a second member prior to joining according to the teachings of the present invention.
Figure 3:
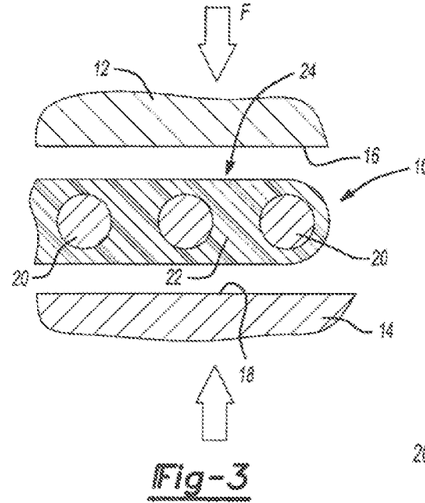
FIG. 3 illustrates an enlarged view of the structural mounting insert shown in FIG. 2.
Figure 4:
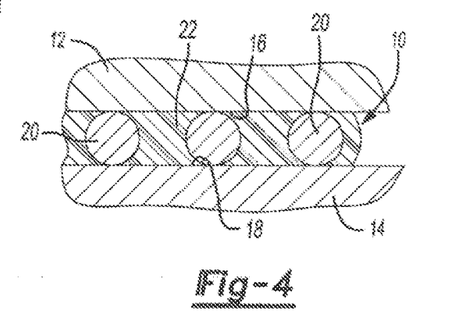
FIG. 4 illustrates the structural mounting insert shown in FIG. 3 after joining of the two components.
Figure 11:
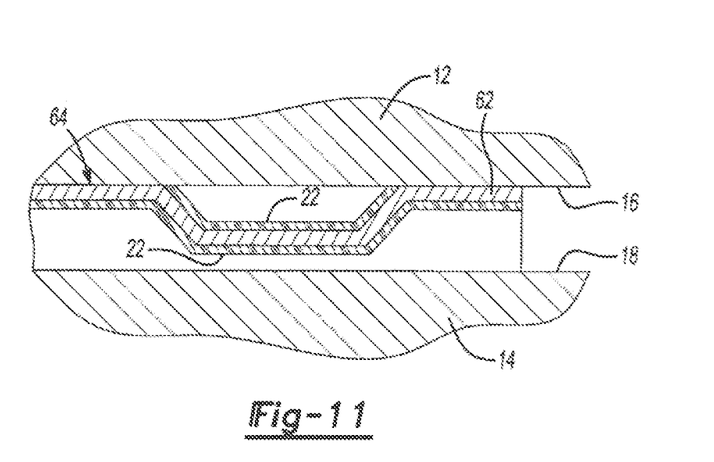
FIG. 11 illustrates the structural mounting insert shown in FIG. 10 after joining of the two components.
Figure 16:
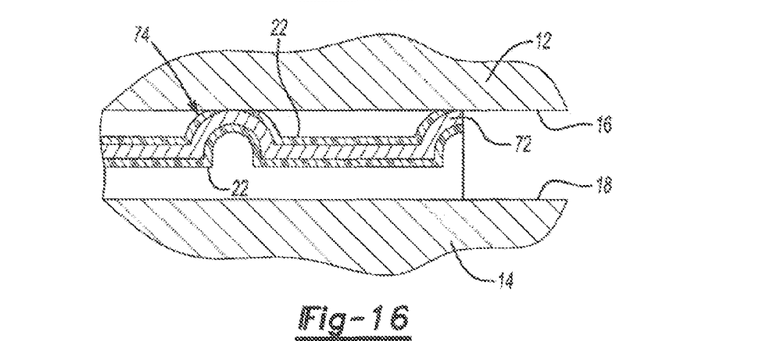
FIG. 16 illustrates the structural mounting insert shown in FIG. 15 after joining of the two components.

Referring to FIGS. 4, 11 and 16, as the force is increased, the second component comprising the sealing material is displaced into the openings or along the projections formed by the first component 20, 62, 72 and/or outside of the end portion of the first component, This displacement continues until the first and second member contact the first component, which may include contact with the projections, At this point the first component acts as a spacer to form and maintain a substantially continuous gap 100 between the first and second member. As previously mentioned, the first component is suitable in strength so as to provide a reactionary force to the applied force without substantial deformation. However, with respect to the second and third embodiments of the first component 62, 72, the projections 64, 74 may be configured to deform towards the surface of the first component. continuous gap between the first and second member. As previously mentioned, the first component is suitable in strength so as to provide a reactionary force to the applied force without substantial deformation. However, with respect to the second and third embodiments of the first component 62, 72, the projections 64, 74 may be configured to deform towards the surface of the first component.

Figure 5:
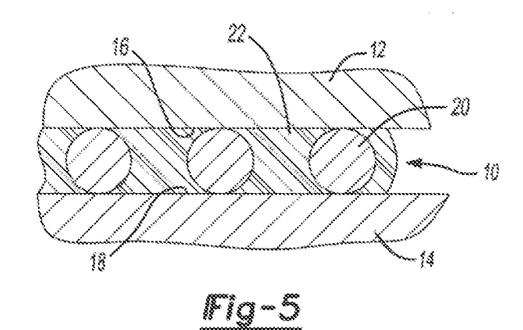
FIG. 5 illustrates the structural mounting insert shown in FIG. 4 after activation of one available material according to the teachings of the present invention.
Figure 12:
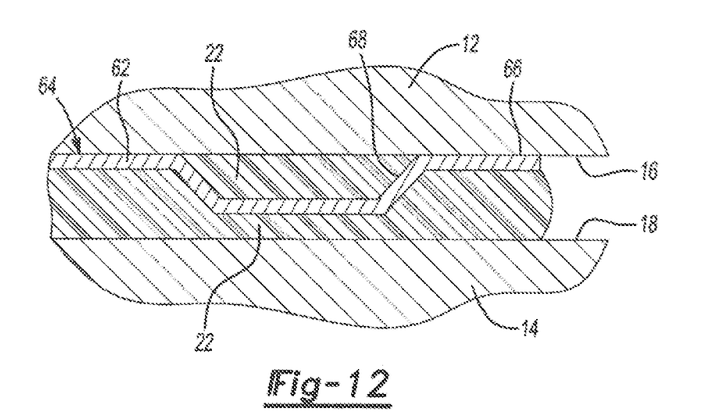
FIG. 12 illustrates the structural mounting insert shown in FIG. 11 after activation of one available material according to the teachings of the present invention.
Figure 13:
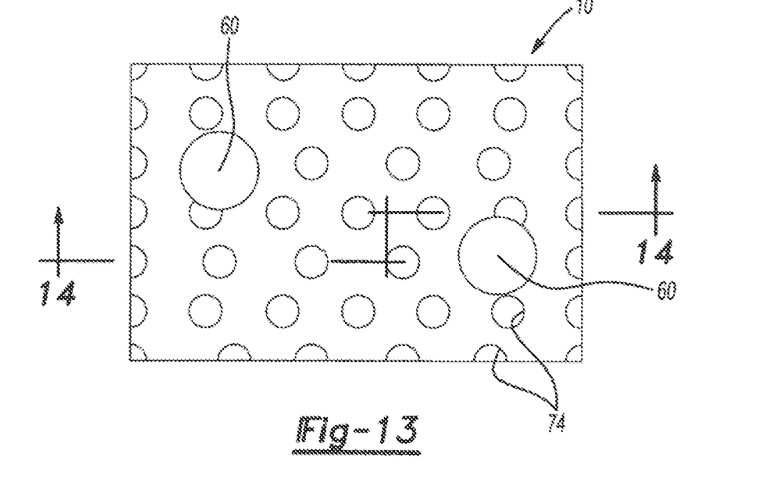
FIG. 13 illustrates a top view of another configuration of the structural mounting insert according to the teachings of the present invention.
Figure 14:
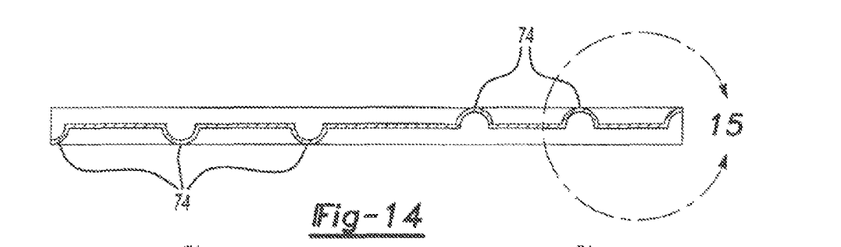
FIG. 14 illustrates a cross section view of the structural insert shown in FIG. 13.
Figure 15:
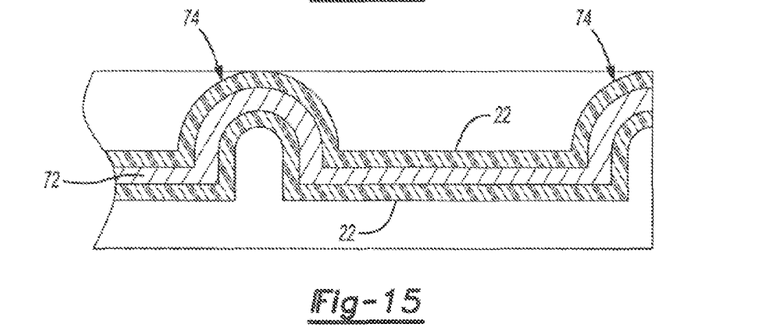
FIG. 15 illustrates an enlarged cross sectional view of FIG. 14.
Figure 17:
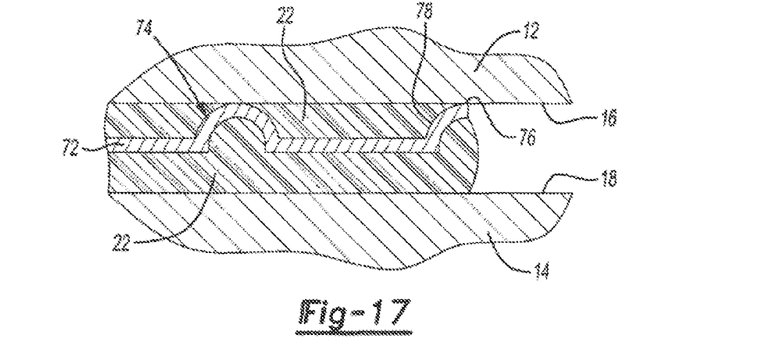
FIG. 17 illustrates the structural mounting insert shown in FIG. 16 after activation of one available material according to the teachings of the present invention.

As shown in FIGS. 5, 12 and 17 with the first and second members attached, the second component may be activated, which in one preferred configuration causes the second component to expand and fill any openings formed by the first component or open spaces formed between the projections. Also, it should be appreciated that the material outside of the first component also expands to form a seal about the entirety of the first component. At this point, the contact regions of the first and second members and the insert are entirely sealed from the surrounding environment.

Figure 6:
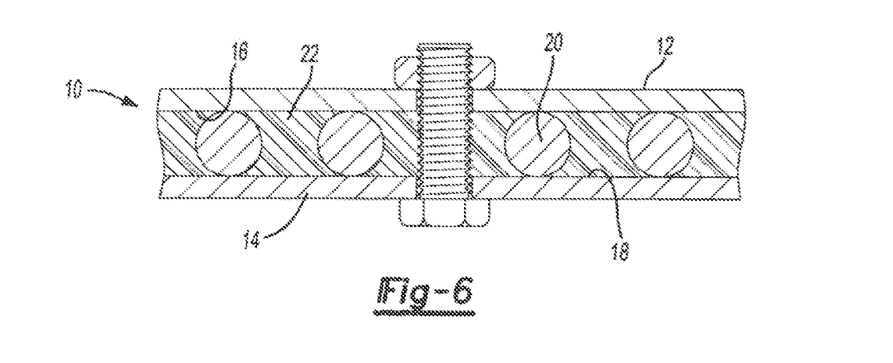
FIG. 6 illustrates a cross sectional view similar to that shown in FIG. 5, but instead taken through a mounting feature used to join the two members.

With reference to FIG. 6, were openings are formed through the insert, the expandable material fills the surrounding area where a fastener extends therethrough to substantially limit or prevent moisture from entering therein.

ONE SPECIFIC EXAMPLE

Figure 7:
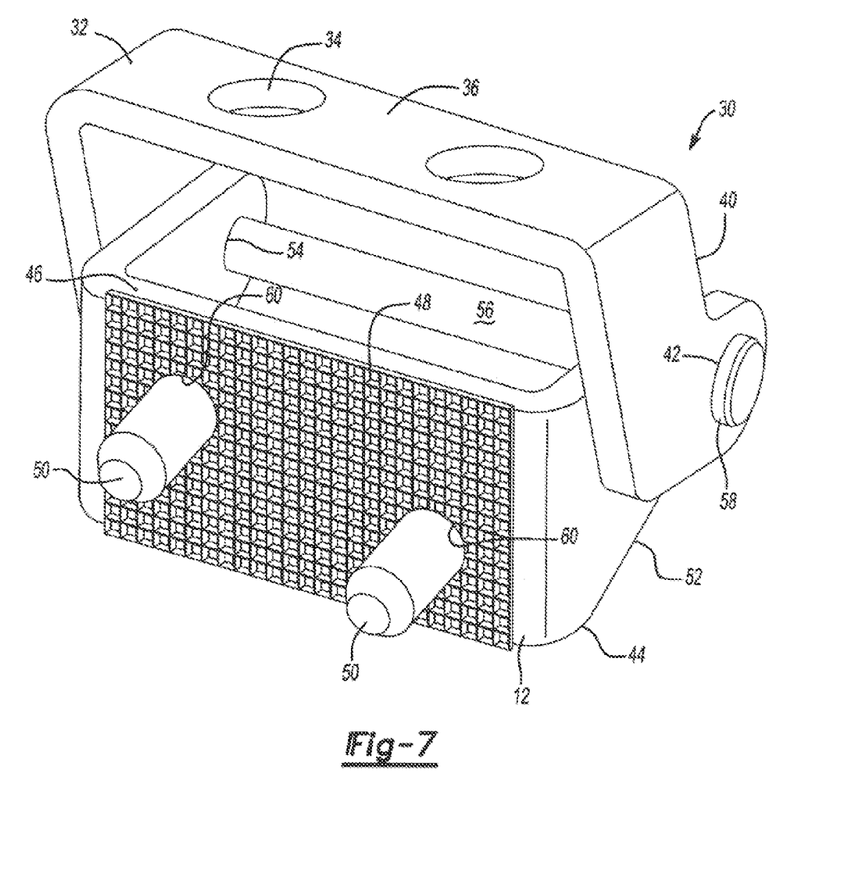
FIG. 7 illustrates one an example of one application of the structural mounting insert according to the teachings of the present invention.
Figure 8:
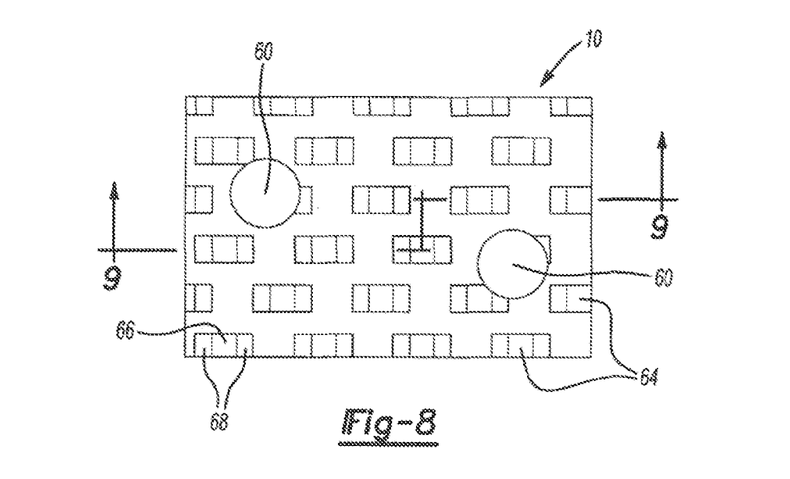
FIG. 8 illustrates a top view of another configuration of the structural mounting insert according to the teachings of the present invention.
Figure 9:
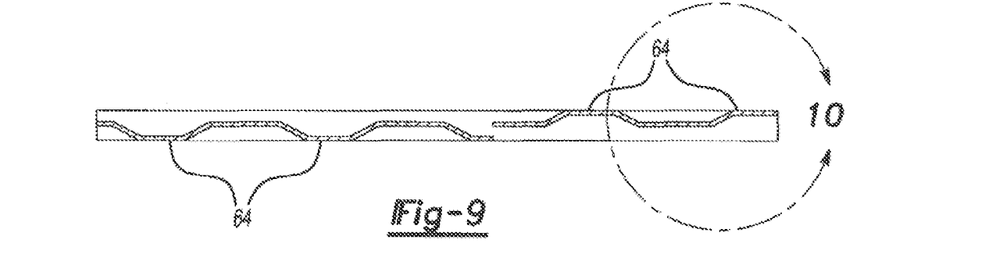
FIG. 9 illustrates a cross section view of the structural insert shown in FIG. 8.
Figure 10:
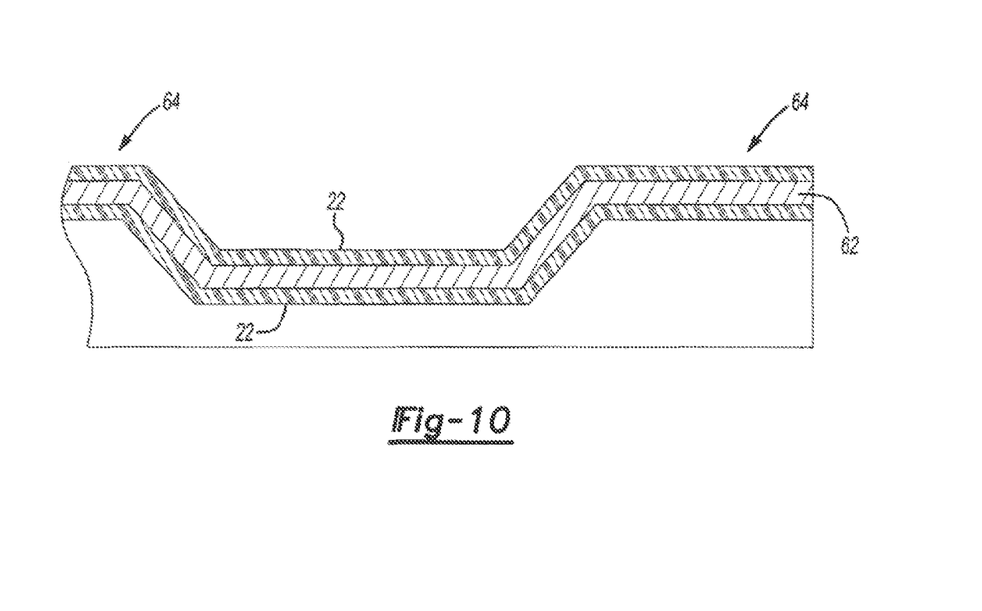
FIG. 10 illustrates an enlarged cross sectional view of FIG. 9.

Referring to FIG. 7, one non-limiting example, and use, of the structural mounting insert of the present invention is shown. In this example, it should be appreciated that any of the embodiments (e.g. first components or otherwise) may be used. In this configuration a hinge assembly 30 is provided for mounting a door component to a frame member of an automotive vehicle. The hinge includes a first hinge portion 32 including a first mounting feature 34 for attachment to a vehicle door. The first hinge portion includes: i) a planar mounting surface 36 including a plurality of holes 38 formed therein for receiving one or more mechanical fasteners used for mounting the first hinge portion to the vehicle door, ii) arms 40 extending from opposite sides of the planar mounting surface, the arms including a first aperture 42 extending through the arms for forming a portion of a pivotal connection.

The hinge also includes a second hinge portion 44 including a second mounting feature 46 for attachment to a vehicle frame member. The second hinge portion includes a planar mounting surface 48 including: i) a plurality of fasteners 50 extending therefrom for mounting the first hinge portion to the vehicle frame member, ii) arms 52 extending from opposite sides of the planar mounting surface, the arms including a second aperture 54 extending through the arms for forming a portion of the pivotal connection.

The hinge further includes a pivotal connection for rotatable attachment of the first hinge portion to the second hinge portion, the pivotal connection formed of the first aperture, the second aperture and a pin 56 extending through the first and second aperture, wherein the are arms of the first and second hinge portion are located adjacent one another and are adapted to rotate with respect to one another, wherein the pivotal connection further includes one or more retaining features 58 from temporarily or permanently preventing removal of the pin from the first and second apertures.

The hinge further includes a structural mounting insert 10 as described herein. As shown, the insert includes openings 60 formed therein for receiving mounting feature of the second hinge portion. These openings may vary between applications.

Other Applications

The reinforcing system of the present invention may be utilized in various aspects of structural reinforcement, particularly in the transportation industry for motorcycles, bicycles, automotive vehicles, boats, trains, or otherwise. In one particularly advantageous application, the reinforcing system of the present invention may be used for applications where metal components are joined together and wherein such components are commonly exposed to moisture. In these configurations, the insert of the present invention provides solid mounting of such components while protecting the same from corrosion. Additional components for which the present invention can be useful include, without limitation front and rear bumper systems, lift gates, underbody reinforcements or the like.

It should be appreciated that the reinforcing system of the present invention may be used in body repair shops, in general assembly plants, or otherwise. Not only does the reinforcing system provide improved attachment for two or more components during original manufacturing, but also provides improved attachment for components which integrity (e.g. strength or otherwise) has be jeopardized, such as during an accident.

The present invention, as has been discussed can provide multiple advantages. As one example, an individual, machine or combination thereof can fasten (e.g., bolt, screw or otherwise affix) two or more surfaces or members together and limit or prevent corrosion and/or loosening of the fasteners (e.g., torque fall off). The limiting or prevention of fastener loosening can be accomplished, in one preferred embodiment, by drawing or forcing together or tightening of the surfaces or members together (e.g., via the fasteners until contact (e.g., metal to metal contact) is achieved between the members or surfaces and the first component. The surfaces or member can continue to be drawn or forced together to produce a compressive force upon the first component that does not experience an undesirably high amount of creep that can be caused by time passing and/or temperature changes. In this manner, force is maintained on the fastener thereby inhibiting or preventing fastener loosening (e.g., torque fall off). The present invention, in turn, can then limit or eliminate checks and re-checks of fastener tightness or torque that might otherwise be needed and can limit or eliminate the need for re-tightening of such fasteners.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A vehicle assembly comprising:
 a first member;
 a second member; and
 a structural mounting insert comprising:
 a metal base member comprising a rigid material that is resistant to deformation upon the application of force, the metal base member including a plurality of openings extending therethrough;

a heat activatable material encased over at least a portion of the metal base member and in the plurality of openings formed therethrough, the heat activatable material being formed of a pliable material, wherein the first member and the second member are generally parallel, and the structural mounting insert is placed between and in contact with the first member and the second member, wherein, upon application of heat, the heat activatable material is adapted to and does expand to seal the metal base member and a connection region between the first member and the second member.

2. The vehicle assembly of claim 1, wherein the metal base member resists deformation during attachment of the first member and the second member, and/or the heat activatable material is displaced into openings in the plurality of openings in the metal base member until the first member and the second member contact the metal base member.

3. The vehicle assembly of claim 1, further including a fastener, the fastener producing a compressive force so that the first member and the second member are drawn into contact with the metal base member.

4. The vehicle assembly of claim 3, wherein the metal base member resists deformation due to the compressive force so that the compressive force is maintained on the metal base member thereby inhibiting or preventing fastener loosening.

5. The vehicle assembly of claim 1, wherein the metal base member is a structural mesh.

6. The vehicle assembly of claim 5, wherein the structural mesh includes at least 10 openings per square inch.

7. The vehicle assembly of claim 5, wherein the structural mesh includes at least 300 openings per square inch.

8. The vehicle assembly of claim 4, wherein the metal base member is a structural mesh, the structural mesh includes at least 150 openings per square inch, and the structural mesh comprises woven threads or wires and the woven threads or wires include a diameter of between 0.3 mm and 0.8 mm.

9. The vehicle assembly of claim 5, wherein the structural mesh comprises woven threads or wires and the woven threads or wires include a diameter of between about 0.25 mm and 2 mm.

10. The vehicle assembly of claim 1, wherein upon application of heat, the heat activatable material displaces so that the metal base member directly contacts both the first member and the second member.

11. The vehicle assembly of claim 1, wherein upon the application of force, the heat activatable material displaces so that the metal base member directly contacts both the first member and the second member.

12. The vehicle assembly of claim 8, wherein upon application of heat, the heat activatable material displaces so that the metal base member directly contacts both the first member and the second member.

13. The vehicle assembly of claim 8, wherein upon application of the compressive force, the heat activatable material displaces so that the metal base member directly contacts both the first member and the second member.

14. The vehicle assembly of claim 1, wherein The metal base member maintains a substantially continuous gap between the first member and the second member after a compressive force has been applied so that the metal base member is in contact with both the first member and the second member.

15. The vehicle assembly of claim 13, wherein the metal base member maintains a substantially continuous gap between the first member and the second member after a compressive force has been applied so that the metal base member is in contact with both the first member and the second member.

16. The vehicle assembly of claim 1, wherein a compressive force is applied so that the metal base member is forced into contact with both the first member and the second member, and the metal base member includes a suitable strength so that the metal base member provides a reactionary force to the compressive force and resists deformation.

17. The vehicle assembly claim 15, wherein the metal base member is suitable in strength so as to provide a reactionary force to the compressive force so that the metal base member resists substantial deformation.

18. The vehicle assembly of claim 1, wherein the first member and the second member are metal components that are commonly exposed to moisture.

19. The vehicle assembly of claim 2, wherein the heat activatable material is co-extruded on the metal base member so that the heat activatable material is encased over at least a portion of the metal base member and in the plurality of openings extending therethrough the metal base member.

20. The vehicle assembly of claim 1, wherein the metal base member is a sheet steel shim stock metal, and wherein the fastener is a bolt that extends through the first member, the second member, and the structural mounting insert.

* * * * *